United States Patent [19]
Tran et al.

[11] Patent Number: 5,926,628
[45] Date of Patent: Jul. 20, 1999

[54] SELECTABLE PRIORITY BUS ARBITRATION SCHEME

[75] Inventors: Cang Ngoc Tran; James Allan Kahle, both of Austin, Tex.

[73] Assignee: International Business Machines Corporation, Armonk, N.Y.

[21] Appl. No.: 08/892,723

[22] Filed: Jul. 15, 1997

[51] Int. Cl.[6] .................................................. G06F 13/36
[52] U.S. Cl. ............................................ 395/293; 395/296
[58] Field of Search ..................................... 395/293, 297, 395/303, 306, 296

[56] References Cited

U.S. PATENT DOCUMENTS

| | | |
|---|---|---|
| 4,648,029 | 3/1987 | Cooper et al. . |
| 4,716,523 | 12/1987 | Burrus, Jr. et al. . |
| 4,779,089 | 10/1988 | Theus ....................................... 395/301 |
| 4,837,677 | 6/1989 | Burrus, Jr. et al. . |
| 4,961,140 | 10/1990 | Pechanek et al. . |
| 5,241,632 | 8/1993 | O'Connell et al. ..................... 395/297 |
| 5,253,348 | 10/1993 | Scalise . |
| 5,388,228 | 2/1995 | Heath et al. ............................. 395/303 |
| 5,396,602 | 3/1995 | Amini et al. ............................. 395/293 |
| 5,416,910 | 5/1995 | Moyer et al. ............................ 395/293 |
| 5,517,626 | 5/1996 | Archer et al. ........................... 395/290 |
| 5,528,767 | 6/1996 | Chen ....................................... 395/293 |
| 5,564,025 | 10/1996 | De Freese et al. ..................... 395/290 |

*Primary Examiner*—Glenn A. Auve
*Attorney, Agent, or Firm*—Sawyer & Associates; Anthony V.S. England

[57] ABSTRACT

A method and system for arbitrating access to a component of a computer have been disclosed the method and system include an arbitration unit for granting access to the component; and a plurality of units for executing a plurality of transactions requiring access to the component. Each transaction of the plurality of transactions has an encoded priority. Each of the plurality of units further provide the arbitration unit with the encoded priority of each of the plurality of transactions. The arbitration unit grants a predetermined number of the plurality of units access to the component in response to the encoded priority of each of the predetermined plurality of transactions.

25 Claims, 5 Drawing Sheets

SELECTABLE PRIORITY BUS ARBITRATION SCHEME

FIELD OF THE INVENTION

The present invention relates to a bus arbitration, and more particularly to a method and system for providing a selectable priority bus arbitration scheme.

BACKGROUND OF THE INVENTION

In computer systems, several different components may require access to a bus or other communication device. For example, in a multi-processor environment, different processors require access to the system bus. Because several of these processors may request access to the bus at approximately the same time, some mechanism for deciding which processor gains access to the bus at a particular time must be employed. To decide which processor gains access to the bus, a bus arbitration unit is typically utilized.

Typically, when a processor has a transaction requiring access to the system bus, the processor sends a bus request ("BR") signal over an associated BR line to the bus arbitration unit. Other processors may send a BR signal to the bus arbitration unit and the bus may currently be occupied with another transaction. The bus arbitration unit uses an arbitration scheme to determine which processor's request for access to the bus will be granted. A bus grant ("BG") signal is sent to the processor being granted access by the bus arbitration unit.

In conventional systems, the bus arbitration unit typically chooses which processor gains access to the bus based on a priority assigned to each of the processors. However, such conventional arbitration schemes are inefficient. Although each processor has a priority associated with it, different transactions may require access to the bus more urgently. These transactions may be performed both by the processor having the highest priority and other processors. Where a processor having low priority performs such a critical transaction, the processor will not be granted access to the bus for the transaction in an expedited manner. Thus, a processor having a high assigned priority that is not executing a critical transaction could consume the bus resources because of the priority scheme.

Accordingly, what is needed is a system and method for providing arbitration which is can dynamically prioritize bus requests. It would also be beneficial if the system was programmable for use in different environments. The present invention addresses such a need.

SUMMARY OF THE INVENTION

A method and system for arbitrating access to a component of a computer have been disclosed the method and system include an arbitration unit for granting access to the component; and a plurality of units for executing a plurality of transactions requiring access to the component. Each transaction of the plurality of transactions has an encoded priority. Each of the plurality of units further provide the arbitration unit with the encoded priority of each of the plurality of transactions. The arbitration unit grants a predetermined number of the plurality of units access to the component in response to the encoded priority of each of the predetermined plurality of transactions.

DETAILED DESCRIPTION OF THE INVENTION

The present invention relates to an improvement in bus arbitration schemes. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown, but is to be accorded the widest scope consistent with the principles and features described herein.

Figure 1:
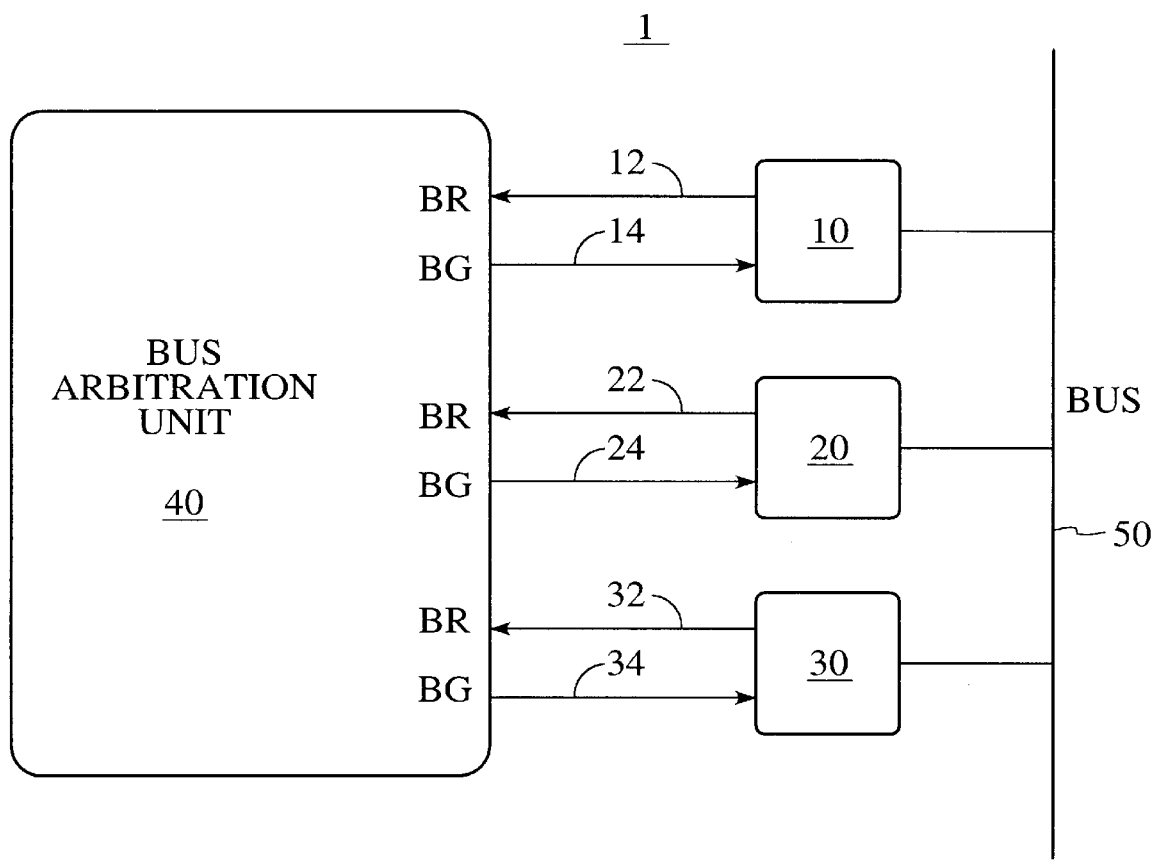
FIG. 1 is a block diagram of a conventional system for arbitrating access to a bus.

FIG. 1 depicts a conventional system 1 requiring arbitration of access to the bus 50. The units 10, 20, and 30 each carry out transactions which could require access to the bus 50. For example, the units 10, 20, and 30 could all be processors. Each unit 10, 20, and 30 is assigned a particular priority for accessing the bus 50.

When the unit 10, 20, or 30 requires access to the bus 50, it sends a bus request ("BR") signal to the arbitration unit 40 over BR lines 12, 22, and 32, respectively. The arbitration unit 40 sends a bus grant ("BG") signal to the unit 10, 20, or 30 over BG lines 14, 24, or 34, respectively, having the highest priority. Thus, access to the bus 50 is granted to the units 10, 20, and 30 based on the priority of each unit 10, 20, or 30.

Conventional systems assign a priority to each of the units 10, 20, or 30. In one conventional system, a particular unit will be preassigned the highest priority for all of its transactions. As a result, this unit will typically be granted access to the bus as soon as the bus becomes available. If, for example, unit 10 has the highest priority, it will be granted access to the bus when the bus becomes available regardless of the transactions being performed by units 20 and 30. In another conventional arbitration scheme, the highest priority is rotated between the units 10, 20, and 30. Thus, one unit is given the highest priority for a predetermined number of its transactions. The unit is then given lowest priority, and the highest priority is granted to another unit. Thus, the priorities rotate among the units.

Although the system 1 is capable of managing transactions for the units 10, 20, and 30 requiring access to the bus 50, those with ordinary skill in the art will realize that the system 1 is inefficient. Although only one unit of the three units 10, 20, and 30 is assigned the highest priority, each of the three units 10, 20, and 30 may be capable of performing transactions requiring quick access to the bus 50. As a result, one of the units 10, 20, or 30 having higher assigned priority, but performing a transaction which does not need quick access to the bus 50 may consume the resources of the bus 50. Consequently, one of the units 10, 20, or 30 having a transaction urgently requiring accesses to the bus 50 but having a low assigned priority may be prevented from accessing the bus.

For example, where the priority of each unit is fixed, the unit with the highest priority typically requires bus access most frequently. Suppose unit 10 is assigned the highest priority. However, the 10 unit may be performing a task for which bus access is not urgent. A second unit, such as unit 20, may be executing a transaction which requires quick access to the bus 50. In this system, the unit 10 may block the unit 20 from gaining access to the bus 50. The transaction requiring immediate access to the bus will, therefore, be delayed.

Similarly, where the priority is rotated between units, the unit having the highest priority at a given time may not be performing a transaction requiring immediate access to the system bus 50. The unit is, however, still granted the highest priority. Thus, the rotating priority arbitration scheme is likewise inefficient.

The present invention provides a method and system for dynamically or programmably determining bus access. The present invention will be described in terms of a system having n units requiring access to a system bus. However, one of ordinary skill in the art will readily recognize that this method and system will operate effectively for other numbers of units and for any system requiring arbitration.

The method and system allow a bus or other arbitration unit to take into account the particular transaction for which each unit is requesting access to the bus or other component. As a result, the priority of each unit for access to the bus or other component is not fixed. Instead, the priority depends, at least in part, upon the transaction being executed by the unit. In one aspect, the method and system also allow a user to program the priorities, including changing the priority of each transaction to respond to different environments. In another aspect, the method and system also allow the time a particular unit has been waiting for access to the bus or other component to adjust the priority of the unit.

Figure 2:
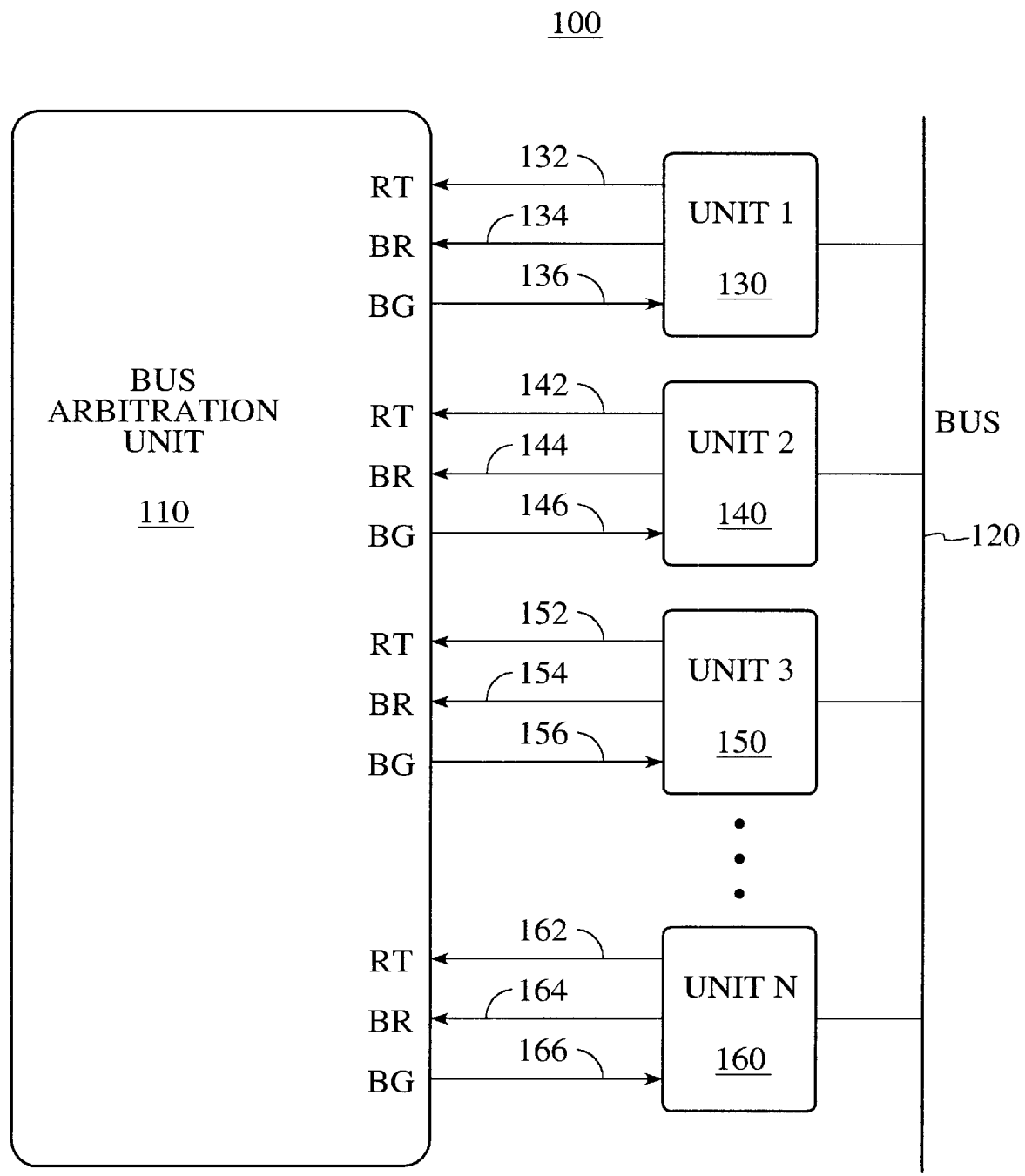
FIG. 2 is a block diagram of one embodiment of a system in accordance with the present invention.

To more particularly illustrate the method and system in accordance with the present invention, refer to FIG. 2 depicting a system 100 in accordance with the present invention. The system 100 could be used for separate processors requiring access to a bus; execution units, such as in a superscalar microprocessor, being arbitrated by a bus interface unit; core units which require access to L1 or L2 caches; or any other units whose access to a particular component requires arbitration. The system 100 contains a bus arbitration unit 110, a plurality of units 130 through 160, and a bus 120.

In the system 100, the bus arbitration unit 110 determines which of the units 130 through 160 gain access to the bus 120. The BR and BG lines 132, 142, 152, 162 and 136, 146, 156 and 166 operate as in a conventional system. Each unit 130, 140, 150, and 160 is also provided with a request transfer ("RT") bus 134, 144, 154, and 164, respectively. Each RT bus 134 through 164 could contain a single line or a plurality of lines. In a preferred embodiment, each RT bus 134 through 164 has two lines. The RT bus 134, 144, 154, and 164 for each unit 120, 140, 150, and 160 allows the unit 130, 140, 150, and 160 to provide a code to the bus arbitration unit 110. The code provided by the RT bus 134 through 164 indicates the priority of the transaction for which the unit 130 through 160 is requesting access to the bus 120. In a preferred embodiment, each RT bus 134 through 164 carries each bit of the code on a separate line.

In one embodiment, the encoded priority of each transaction being executed by a particular one of the units 130 through 160 determines the priority of the unit 130, 140, 150, or 160. Thus, each unit 130 through 160 requests access to the bus using the BR line and provides the bus arbitration unit 110 with an encoded signal over the RT bus. The encoded signal indicates the priority of the transaction and determines which unit gains access to the bus 120. In a preferred embodiment, a code signal of all zeroes would indicate the highest priority.

For example, in one priority scheme, the RT bus 134, 144, 154, or 164 provides a three bit encoded signal indicating the priority of a transaction. In this example each RT bus 134, 144, 154, and 164 contain three lines. In one embodiment of this priority scheme, a signal of (000) provided over an RT bus 134, 144, 154, or 164 indicates a transaction having the highest priority. In a preferred embodiment of this priority scheme, the remaining codes in order from highest to lowest priority are: (111), (110), (010), (101), (100), (011), (001). Thus, a unit 130, 140, 150, or 160 providing the bus arbitration unit with a signal of (000) over the associated RT bus 134, 144, 154, or 164 will have the highest priority. Similarly, a unit 130, 140, 150, or 160 providing the bus arbitration unit with a signal of (010) over the associated RT bus 134, 144, 154, or 164 will have a medium priority. A unit 130, 140, 150, or 160 providing the bus arbitration unit with a signal of (010) over the associated RT bus 134, 144, 154, or 164 will have the lowest priority.

In another embodiment, both the identity of each unit 130, 140, 150, and 160 and the priority of the transaction are taken into account in determining access to the bus 120. As a result the bus arbitration unit 110 receives both the encoded priority of a particular transaction and a signal indicating which unit 130, 140, 150, or 160 is executing the particular transaction. Based on both the identity of the unit and the coded priority of the transaction received from each of the units 130 through 160 requesting access to the bus, the bus arbitration unit 110 determines which unit 130 through 160 gains access to the bus 120.

The system 100 may also take into account the time that a unit has been requesting access to the bus for a particular transaction. In such an embodiment, the system 100 could adjust the priority of a particular transaction if the unit executing the transaction has been requesting access to the bus for greater than a predetermined time. For example, a transaction having an RT code of (101) may be given priority over another transaction having an RT code of (000) if the RT code of (101) has been asserted for at least 10 microseconds. Although not expressly discussed, other priority schemes may be incorporated into the RT code or the bus arbitration unit 110.

The system 100 is depicted with separate BR line and RT bus 132, 142, 152, and 162 and 134, 144, 154, and 164, respectively. However, nothing prevents the method and system from using a single bus to carry the encoded priority and determine if the bus is being requested. In such an embodiment, the bus grant would operate as previously discussed. However, the priority bus would carry a single code indicating whether the bus was requested and the priority of the transaction. In a preferred embodiment of such a method and system, an all zero code would indicate that no request is being made. In the preferred embodiment, if any digit of the code is a one, then a bus request is being made. In such an embodiment, the bus arbitration unit 110 could determine whether the bus 120 is being requested by providing each line carrying each digit of the encoded priority to an OR gate (not shown). The resultant of such an OR gate would determine whether the bus is being requested.

For example, in one priority scheme, the priority line provides a three bit signal indicating the priority of a transaction and whether a bus request is being made. In a preferred embodiment, each RT bus 134 through 164 would contain three lines. In one embodiment of this priority scheme, an encoded signal of (000) provided over the priority line indicates that no request is being made. A code of (100) indicates a transaction having the highest priority. In a preferred embodiment of this priority scheme, the remaining codes in order from highest to lowest priority are: (111), (110), (010), (101), (011), (001). Thus, a unit 130, 140, 150, or 160 providing the bus arbitration unit with a signal of (000) over the associated priority line is not requesting access to the bus 120. A unit 130, 140, 150, or 160 providing the bus arbitration unit with a signal of (100) over the associated priority line will have the highest priority. Similarly, a unit 130, 140, 150, or 160 providing the bus arbitration unit with a signal of (010) over the associated priority line will have a medium priority. A unit 130, 140, 150, or 160 providing the bus arbitration unit with a signal of (001) over the associated priority line will have the lowest priority. As discussed above, the identity of the unit 130 through 160 requesting access to the bus 120 as well as the time for which the units 130 through 160 has been requesting access for a particular transaction can be taken into account in granting access to the bus 120.

Figure 3:
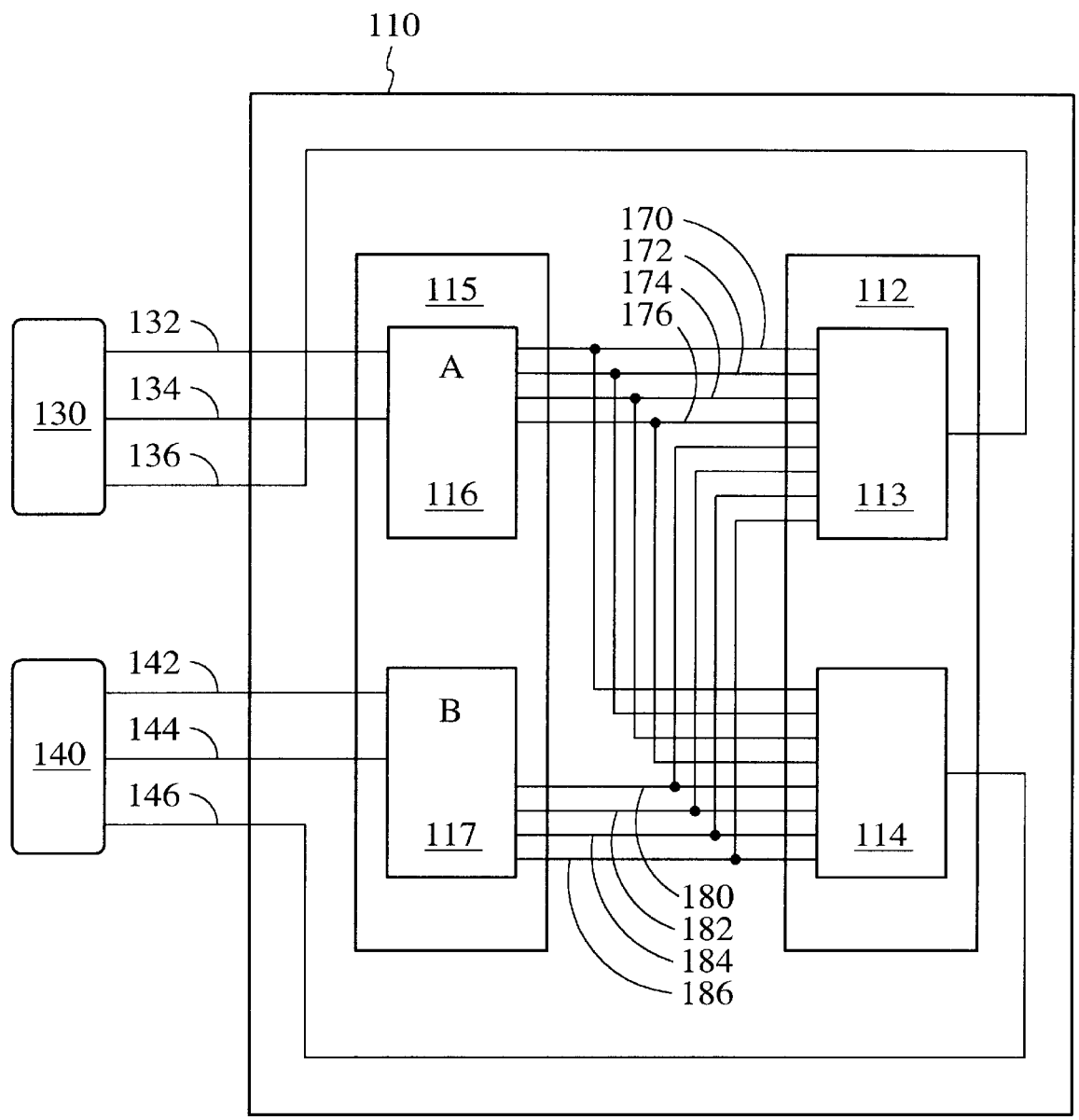
FIG. 3 is a block diagram of one embodiment of an arbitration unit in accordance with the method and system.

FIG. 3 depicts one embodiment of the bus arbitration unit 110 in accordance with the method and system. The bus arbitration unit 110 arbitrates access to the bus 120 in a system having only two units 130 and 140. Because the bus arbitration unit 110 does not merely arbitrate access based on the priority of a particular unit 130 or 140, the arbitration unit may be more complex than in a conventional system. In addition, the actual implementation of the bus arbitration unit 110 can vary widely without affecting the function of the method and system. For example, in systems having a great deal of traffic, the bus arbitration unit 110 will be significantly more complex. However, for lower end system, the bus arbitration unit 110 will be significantly simpler, which helps reduce the cost.

The embodiment of the bus arbitration unit 110 shown in FIG. 3 includes a selector 112 a priority decoder 115. The priority decoder 115 decodes the encoded priority provided by each unit 130 and 140. The priority decoder 115 contains two decoders 116 and 117. Each decoder 116 and 117 is associated with a unit 130 and 140, respectively. The priority selector 112 chooses which unit has the highest priority and grants the unit first access to the bus. The priority selector 112 has two selectors 113 and 114. Each selector 113 and 114 corresponds to one of the decoders 116 and 117.

Because the BR lines 132 and 142 indicate whether the units 130 and 140, respectively, are requesting access to the bus, the BR lines 132 and 142 also determine whether the decoders 116 and 117, respectively, are active. If the BR line 132 or 142 is not asserted, then the associated decoder 116 or 117 is inactive. In one embodiment, the BR line 132 or 142 is asserted when a digital one is provided over the BR line 132 or 142. However, nothing prevents the method and system from being used in a system where the BR line 132 or 142 is asserted by providing a digital zero.

Each of the decoders 116 and 117 receives an encoded priority over the RT bus 134 and 144. As previously discussed, in one embodiment, the encoded priority can be programmed to correspond to different functions, or different types of transactions. In the embodiment shown in FIG. 3, the encoded priority is a two bit code. Thus, in the embodiment shown in FIG. 3, the RT buses 134 and 144 each contain two lines. As a result, there are four possible encoded priorities, (00), (01), (10), and (11). The decoders 115 and 116 provide a signal on one of the lines 170, 172, 174, and 176 and 180, 182, 184, and 186, respectively. For each encoded priority, each of the decoders 115 and 116 asserts a single line. For example, in one embodiment, a code of (00) will cause decoders 115 and 116 to assert the lines 170 and 180. A code of (01) will cause decoders 115 and 116 to assert the lines 172 and 182. A code of (10) will cause decoders 115 and 116 to assert the lines 174 and 184. Finally, a code of (11) will cause decoders 115 and 116 to assert the lines 176 and 186.

Figure 4:
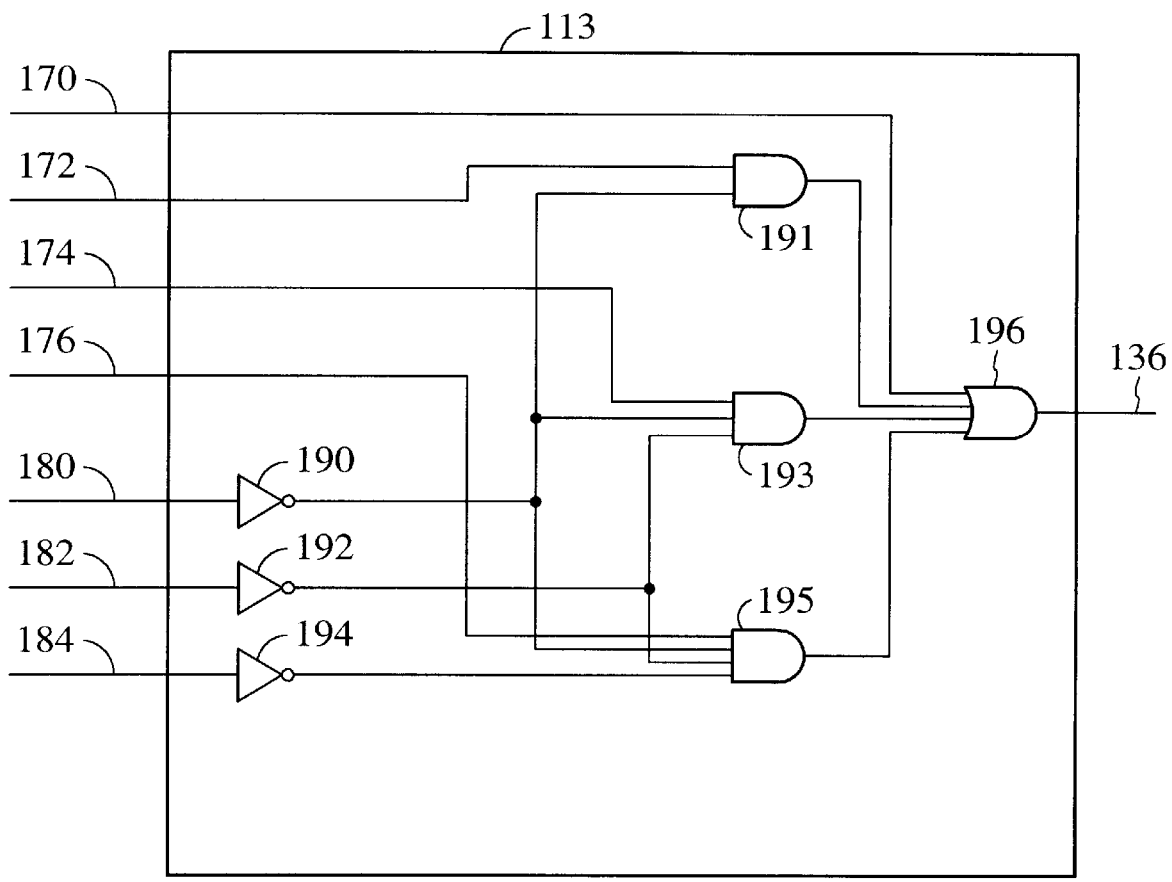
FIG. 4 is a diagram of one embodiment of a priority selector in accordance with the method and system.

The priority selector 112 determines the priority of the transactions based on the lines asserted by decoders 115 and 116. In a preferred embodiment, the priority of each of the lines 170 through 186 is programmable. Thus, not only is the function corresponding to a particular encoded priority programmable, but the actual priority of a given encoded priority is also programmable. Thus, a user can alter either the transactions to which a particular encoded priority corresponds or the priority scheme, the urgency associated with each encoded priority, in order to use the method and system in different environments Refer now to FIG. 4, which depicts one embodiment of the selector 113. The selector 113 may be used where the highest priority is associated with line 170. Thus, an encoded priority of (00) from the unit 130 has the highest priority. The next highest priority is associated with line 180, corresponding to an encoded priority of (00) from the unit 140. In the priority selector 113, line 172, which corresponds to an encoded priority of (01) from the unit 130, has the next highest priority, followed by line 182. In descending order, the remaining priorities are from lines 174, 184, 176, and 186. Because the line 186 has the lowest priority in this embodiment, the line 186 does not need to be coupled to the selector 113. However, in another embodiment, where the line 186 does not have the lowest priority, the line 186 may be coupled to the selector 113.

If line 170 is asserted, the resultant of OR gate 196 will be high and a BG signal will be asserted over line 136. In the embodiment of the decoder 113, a BG is asserted when the line 136 provides a digital one. Note, however, that nothing prevents the method and system from use in a system where the BG is asserted when the line provides a digital zero. The decoder 113 also compares lines 172 and the inverted output of line 180. If line 180 is asserted, the output from AND gates 191, 193, and 195 will be low. Therefore, unless line 170 is also asserted, the output of the OR gate 196 will be low and the BG signal will not be asserted over BG line 136.

If line 182 is asserted, then the output of AND gates 193 and 195 will be low. Unless either line 172 or line 170 is asserted, the resultant of OR gate 196 will be low. If, however, line 172 is asserted, the resultant of AND gate 191 will be high because line 180 cannot be asserted when line 182 is asserted. In this case, the BG signal will be asserted over BG line 136.

If line 184 is asserted, the resultant of AND gate 195 will be low. Thus, if any of lines 170, 172, or 174 is asserted, a BG signal will be provided to the unit 130 over BG line 136. If line 186, which has the lowest priority, is asserted by the decoder 116, then the BG signal will be provided to unit 130 over the BG line 136. Similarly, if the unit 140 did not request bus access, then the BG signal will be provided to the unit 130. Thus, the unit 130 will only be granted access to the bus when the priority of the transaction being executed by unit 130 is higher than the priority of the transaction being performed by the unit 140.

Figure 5:
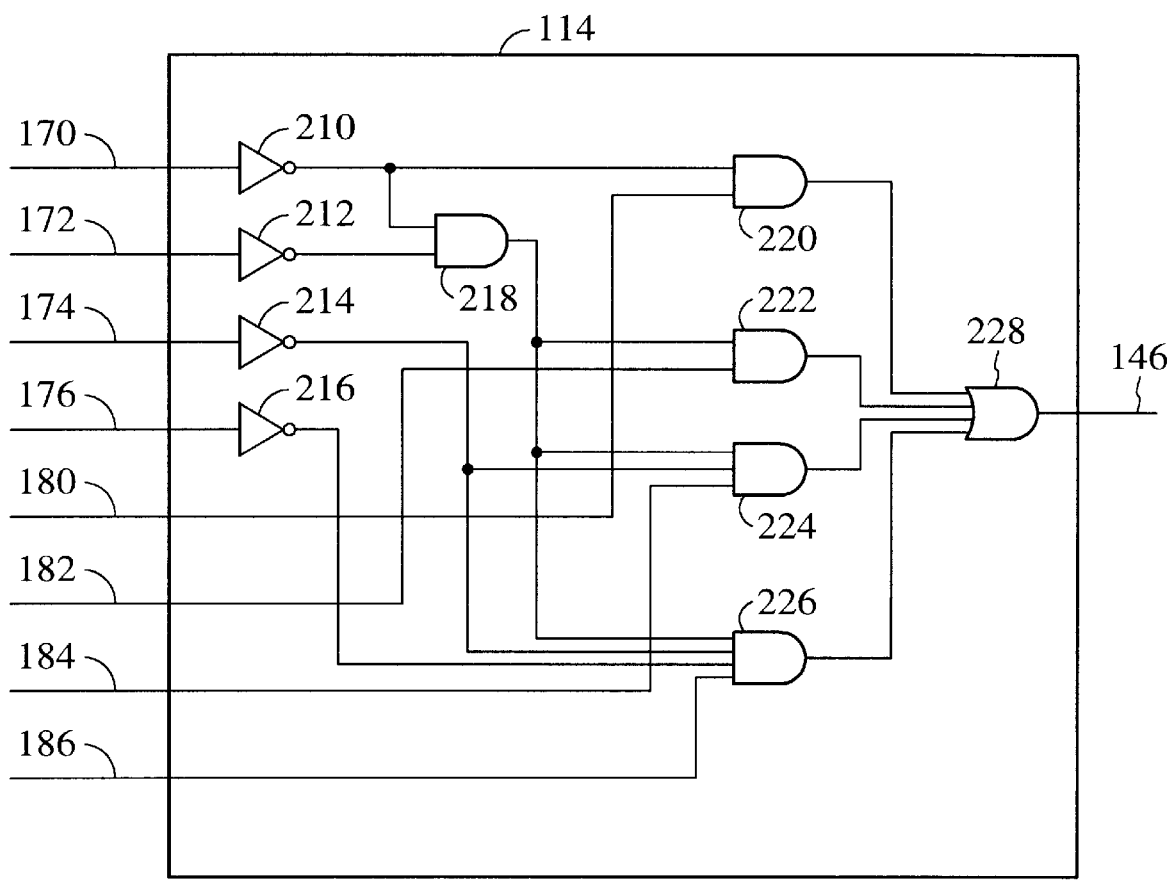
FIG. 5 is a diagram of another embodiment of a priority selector in accordance with the method and system.

FIG. 5 depicts one embodiment of the selector 114. The selector 114 for the decoder 116 behave similarly to the selector 113 and detector 113. If only unit 140 requests access to the bus, then the BG signal will be asserted over BG line 146. If both units 130 and 140 request access and the priority of the transaction being executed by the unit 140 is higher than the priority of the transaction being performed by the unit 130, then the BG signal will be asserted over the BG line 146. Only in these cases will the unit 140 be granted access to the bus.

As previously discussed, the method and system assign each transaction an encoded priority. The code can be assigned to each transaction based on the function of the transaction, such as snoop-copyback, read or write data, speculative read data, speculative instruction fetch, instruction fetch, instruction pre-fetch, or any other function. The code assigned to a particular transaction may also depend on the environment. Consequently, the priority assigned to particular transactions is programmable through software. In one embodiment, both the encoded priority corresponding to a function and the priority scheme, which encoded priority corresponds to the highest priority, are programmable. As a result, the function of the transaction, the time the transaction has been waiting for access to the bus, the identity of the unit requesting access to the bus, and any other parameters deemed important may be used to arbitrate access to a bus or other component.

A method and system have been disclosed for providing a selectable priority arbitration scheme. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A system for arbitrating access to a component of a computer, the system comprising:
   an arbitration unit for granting access to the component; and
   a plurality of units for executing a plurality of transactions requiring access to the component, each transaction of the plurality of transactions having an encoded priority, each of the plurality of units further for providing the arbitration unit with the encoded priority of each of the plurality of transactions; wherein the arbitration unit grants a predetermined number of the plurality of units access to the component in response to the encoded priority of each transaction of the plurality of transactions requiring access to the component and in response to a time interval over which each of the plurality of transactions has requested access to the component.

2. The system of claim 1 wherein the each of the plurality of units further indicates to the arbitration unit whether each of the plurality of units requests access to the component.

3. The system of claim 2 wherein the encoded priority of each of the plurality of transactions is programmable.

4. The system of claim 1 wherein each of the plurality of units further has an identity; each of the plurality of units further for providing the arbitration unit with its identity; the arbitration unit granting the predetermined number of the plurality of units access to the component in response to the identity of each of the plurality of units and the encoded priority of each of the plurality of transactions.

5. The system of claim 4 wherein the encoded priority of each transaction of the plurality of transactions is programmable.

6. The system of claim 4 wherein the arbitration unit further grants the predetermined number of the plurality of units access to the component in response to the identity of each of the plurality of units, the encoded priority of each of the plurality of transactions and the time interval over which each of the plurality of transactions has requested access to the bus.

7. The system of claim 6 wherein the encoded priority of each transaction of the plurality of transactions is programmable.

8. The system of claim 7 wherein each of the plurality of units is coupled to the arbitration unit by at least one line.

9. The system of claim 8 wherein the at least one line further comprise:
   a first line for indicating whether each of the plurality of units requests access to the component; and
   a second line for providing the arbitration unit with the encoded priority of each transaction of the plurality of transactions requiring access to the component.

10. The system of claim 9 wherein the encoded priority of all zeroes indicates a highest priority transaction.

11. The system of claim 10 wherein the component is a bus.

12. The system of claim 11 wherein the plurality of units further comprise a plurality of processors.

13. The system of claim 12 wherein the encoded priority of each of the plurality of transactions is programmable.

14. A system for arbitrating access to a component of a computer, the system comprising:
   an arbitration unit for granting access to the component; and
   a plurality of units for executing a plurality of transactions requiring access to the component, each of the plurality of units having an identity, each of the plurality of transactions having an encoded priority, each of the plurality of units being coupled to the arbitration unit through at least one line, the at least one line for providing the arbitration unit with the encoded priority of each of the plurality of transactions, for providing the arbitration unit with the identity of each unit, and for indicating whether each unit of the plurality of units requests access to the component; wherein the arbitration unit grants a predetermined number of the plurality of units access to the component in response to the encoded priority of each of the transactions, the identity of each of the plurality of units, and a time interval over which each of the plurality of transactions has requested access to the component.

15. The system of claim 14 wherein the encoded priority of each of the plurality of transactions is programmable.

16. The system of claim 14 wherein the encoded priority of each of the plurality of transactions is programmable.

17. The system of claim 16 wherein the encoded priority of all zeroes indicates a access to the component has not been requested.

18. The system of claim 16 wherein the plurality of units further comprise a plurality of processors.

19. The system of claim 14 wherein the component is a bus.

20. A method for arbitrating access to a component in a computer system, the computer system including an arbitration unit for granting access to the component and a plurality of units, the plurality of units for executing a plurality of transactions requiring transactions requiring access to the component, each of the plurality of transactions having an encoded priority, the method comprising the steps of:

(a) requesting access to the component by each of the plurality of units currently executing a transaction of the plurality of transactions;

(b) providing the arbitration unit with the encoded priority for each of the plurality of transactions currently being executed; and (c) granting access to the component for a predetermined number of the plurality of units in response to the encoded priority of each transaction of the plurality of transactions that is currently being executed and in response to a time interval over which each transaction of the plurality of transactions currently being executed has requested access to the component.

21. The method of claim 20 further comprising the step of:

(d) allowing a user to program the encoded priority for each of the plurality of transactions.

22. The method of claim 20 wherein step (b) further comprises the step of:

(b1) providing the arbitration unit with the encoded priority for each of the plurality of transactions currently being executed and providing the arbitration unit with an identity of each of the plurality of units currently executing a transaction of the plurality of transactions; and wherein step (c) further comprises the step of (c1) granting access to the component for the predetermined number of the plurality of units in response to the encoded priority of each transaction of the plurality of transactions currently being executed and in response to the identity of each of the plurality of units currently executing a transaction of the plurality of transactions.

23. The method of claim 22 further comprising the step of:

(d) allowing a user to program the encoded priority for each transaction of the plurality of transactions.

24. The method of claim 20 wherein the component is a bus.

25. The method of claim 24 wherein the plurality of units further comprise a plurality of processors.

* * * * *